(12) United States Patent
Kuang

(10) Patent No.: US 9,346,704 B2
(45) Date of Patent: May 24, 2016

(54) OPTICAL GLASS

(71) Applicant: CDGM GLASS CO., LTD., Chengdu, Sichuan (CN)

(72) Inventor: Bo Kuang, Sichuan (CN)

(73) Assignee: CDGM Glass Co., Ltd., Chengdu, Sichuan (CN)

( * ) Notice: Subject to any disclaimer, the term of this patent is extended or adjusted under 35 U.S.C. 154(b) by 0 days.

(21) Appl. No.: 14/433,989

(22) PCT Filed: Oct. 17, 2013

(86) PCT No.: PCT/CN2013/085385
§ 371 (c)(1),
(2) Date: Apr. 7, 2015

(87) PCT Pub. No.: WO2014/059937
PCT Pub. Date: Apr. 24, 2014

(65) Prior Publication Data
US 2015/0251946 A1    Sep. 10, 2015

(30) Foreign Application Priority Data

Oct. 19, 2012  (CN) .......................... 2012 1 0398883

(51) Int. Cl.
*C03C 3/062*  (2006.01)
*C03C 3/068*  (2006.01)

(52) U.S. Cl.
CPC ..................................... *C03C 3/068* (2013.01)

(58) Field of Classification Search
CPC ........ C03C 3/062; C03C 3/064; C03C 3/066; C03C 3/068
See application file for complete search history.

(56) References Cited

U.S. PATENT DOCUMENTS

| | | |
|---|---|---|
| 5,288,669 A | 2/1994 | Grateau et al. |
| 7,955,998 B2 * | 6/2011 | Hayashi ................. C03B 11/08 501/50 |
| 2003/0032542 A1 | 2/2003 | Endo |
| 2003/0211929 A1 | 11/2003 | Hayashi et al. |
| 2005/0049135 A1 | 3/2005 | Hayashi |
| 2009/0088310 A1 | 4/2009 | Suzuki et al. |
| 2009/0163345 A1 * | 6/2009 | Onoda .................... C03C 3/068 501/78 |
| 2010/0304950 A1 * | 12/2010 | Tomeno ................. C03C 3/068 501/78 |
| 2011/0077142 A1 * | 3/2011 | Yamaguchi ............. C03C 3/068 501/78 |

FOREIGN PATENT DOCUMENTS

| | | |
|---|---|---|
| CN | 1445188 A | 10/2003 |
| CN | 1590329 A | 3/2005 |
| CN | 101029938 A | 9/2007 |
| JP | 2007230835 | 9/2007 |

OTHER PUBLICATIONS

International Search Report for PCT/CN2013/085385, Jan. 23, 2014.

* cited by examiner

*Primary Examiner* — Noah Wiese
(74) *Attorney, Agent, or Firm* — Caesar Rivise, PC

(57) ABSTRACT

The invention provides a kind of high-precision molding optical glass, comprising 0.1-10 wt % of $SiO_2$, 9-20 wt % of $B_2O_3$, 20-35 wt % of $La_2O_3$, 1-8 wt % of $ZrO_2$, 5-20 wt % of ZnO, 1-10 wt % of $Ta_2O_5$, 5-15 wt % of $Gd_2O_3$, 0-2 wt % of $TiO_2$, 1-10 wt % of $Y_2O_3$, 1-12 wt % of $WO_3$, 0-3 wt % of $Li_2O$ and 0-1 wt % of $Sb_2O_3$. The optical glass provided in the invention features density less than 5.0 g/cm³, refractive index between 1.80 and 1.85, Abbe number between 40 and 45, transition temperature lower than 600° C., wavelength $\lambda_{80}$ corresponding to the transmissivity of 80% below 415 nm, and upper limit of devitrification temperature below 1110° C., and is applicable to high-precision molding.

30 Claims, No Drawings

OPTICAL GLASS

TECHNICAL FIELD

The invention relates to a kind of optical glass, in particular to a kind of high-precision molding optical glass with refractive index (nd) ranging from 1.80 to 1.85 and Abbe number ranging from 40 to 45, as well as to the preform and optical element made of said optical glass.

BACKGROUND ART

In recent years, with the development of optoelectronics industry, the optical equipment is required to be miniature and lightweight with high performance. In order to reduce the number of lenses constituting the optical system in optical equipment, more and more aspheric lenses are applied in optical design. At present, high-precision molding is widely used for aspheric lens manufacture, which refers to press molding of glass preform under certain temperature and pressure by high-precision mould with predetermined shape, in order to obtain the final shape or glass products with optical functional surface. The aspheric lenses manufactured with high-precision molding technology usually no longer require grinding and polishing, thereby reducing costs and improving productivity.

In order to replicate the high-precision modular surface on the glass moldings during high-precision molding, the glass preform is required to be pressurized under high temperature (usually 15-40° C. above the softening point temperature of glass). At this point, shaping mould is exposed under high temperature with higher pressure. The surface layer of compression mold remains vulnerable to oxidative attack even under protection. High-precision mould is the major source of high-precision molding costs, so if mould usage does not reach a certain number, the purpose of low cost and high productivity will not be achieved. To prolong the service life of mould and reduce damage to the shaping mould by high-temperature environment, molding temperature shall be reduced as much as possible. Therefore, the transition temperature (Tg) of glass materials is required to be as low as possible.

Chromatic correction is carried out by the combination of high and low dispersion lenses in modern optical imaging system. In recent years, both high and low dispersion lenses apply optical glass with higher refractivity when aberration correction is available, which makes high-refractivity and low-dispersion optical glass become more important in the field of optical glass.

US20030032542 discloses a kind of optical glass, with refractive index above 1.80, Abbe number around 40 but transition temperature of glass over 650° C., which is not suitable to be used as high-precision molding material. Besides, U.S. Pat. No. 5,288,669 discloses a kind of optical glass with refractive index above 1.88 and Abbe number over 29, of which the disadvantage is that the glass has low viscosity and is liable to be refractory.

CONTENTS OF THE INVENTION

A technical problem to be solved by the invention is to provide a kind of high-precision molding optical glass, with density less than 5.0 g/cm$^3$, refractive index (nd) between 1.80 and 1.85, Abbe number (vd) between 40 and 45, transition temperature lower than 600° C., wavelength $\lambda_{80}$ corresponding to the transmissivity of 80% below 415 nm, and upper limit of devitrification temperature below 1110° C.

To solve the technical problem, the invention provides a kind of optical glass comprising $SiO_2$, $B_2O_3$, $La_2O_3$, $ZrO_2$, ZnO, $Ta_2O_5$, $Gd_2O_3$, $Y_2O_3$ and $WO_3$, with density less than 5.0 g/cm$^3$, refractive index between 1.80 and 1.85, Abbe number between 40 and 45, transition temperature lower than 600° C., wavelength $\lambda_{80}$ corresponding to the transmissivity of 80% below 415 nm, and upper limit of devitrification temperature below 1110° C.

Furthermore, said optical glass comprises 0.1-10 wt % of $SiO_2$, 9-20 wt % of $B_2O_3$, 20-35 wt % of $La_2O_3$, 1-8 wt % of $ZrO_2$, 5-20 wt % of ZnO, 1-10 wt % of $Ta_2O_5$, 5-15 wt % of $Gd_2O_3$, 0-2 wt % of $TiO_2$, 1-10 wt % of $Y_2O_3$, 1-12 wt % of $WO_3$, 0-3 wt % of $Li_2O$ and 0-1 wt % of $Sb_2O_3$.

Furthermore, $SiO_2$ accounts for 3 to 7%.
Furthermore, $B_2O_3$ accounts for 14 to 18% and $La_2O_3$ accounts for 27 to 32%.
Furthermore, $ZrO_2$ accounts for 2 to 6%.
Furthermore, ZnO accounts for 12 to 17%.
Furthermore, $Ta_2O_5$ accounts for 2 to 7%.
Furthermore, $La_2O_3$ accounts for 27 to 32% and $Gd_2O_3$ is greater than 10% but less than 15%.
Furthermore, $Y_2O_3$ accounts for 4 to 8%.
Furthermore, the total content of $SiO_2$, $B_2O_3$, $La_2O_3$, $ZrO_2$, ZnO, $Ta_2O_5$, $Gd_2O_3$, $Y_2O_3$ and $WO_3$ is greater than 97%.
Furthermore, $La_2O_3/La_2O_3+Gd_2O_3+Y_2O_3$ is less than 0.67.
Furthermore, the weight percentage ratio of $Y_2O_3$, $Gd_2O_3$ and $La_2O_3$ is 1:(1.5-2.5):(5-6).
Furthermore, $TiO_2$ accounts for 0.2 to 0.5%.
Furthermore, $WO_3$ accounts for 4 to 7%.
Furthermore, $Li_2O$ accounts for 0.1 to 1%.

A kind of optical glass comprises 0.1-10 wt % of $SiO_2$, 9-20 wt % of $B_2O_3$, 20-35 wt % of $La_2O_3$, 1-8 wt % of $ZrO_2$, 5-20 wt % of ZnO, 1-10 wt % of $Ta_2O_5$, 5-15 wt % of $Gd_2O_3$, 0-2 wt % of $TiO_2$, 1-10 wt % of $Y_2O_3$, 1-12 wt % of $WO_3$, 0-3 wt % of $Li_2O$ and 0-1 wt % of $Sb_2O_3$.

Furthermore, $SiO_2$ accounts for 3 to 7%.
Furthermore, $B_2O_3$ accounts for 14 to 18% and $La_2O_3$ accounts for 27 to 32%.
Furthermore, $ZrO_2$ accounts for 2 to 6%.
Furthermore, ZnO accounts for 12 to 17%.
Furthermore, $Ta_2O_5$ accounts for 2 to 7%.
Furthermore, $La_2O_3$ accounts for 27 to 32% and $Gd_2O_3$ is greater than 10% but less than 15%.
Furthermore, $TiO_2$ accounts for 0.2 to 0.5%.
Furthermore, $Y_2O_3$ accounts for 4 to 8%.
Furthermore, $WO_3$ accounts for 4 to 7%.
Furthermore, $Li_2O$ accounts for 0.1 to 1%.
Furthermore, the total content of $SiO_2$, $B_2O_3$, $La_2O_3$, $ZrO_2$, ZnO, $Ta_2O_5$, $Gd_2O_3$, $Y_2O_3$ and $WO_3$ is greater than 97%.
Furthermore, $La_2O_3/La_2O_3+Gd_2O_3+Y_2O_3$ is less than 0.67.
Furthermore, the weight percentage ratio of $Y_2O_3$, $Gd_2O_3$ and $La_2O_3$ is 1:(1.5-2.5):(5-6).

A glass preform made of the above-mentioned optical glass.

An optical element made of the above-mentioned optical glass.

An optical apparatus made of the above-mentioned optical glass.

The optical glass provided by the invention is advantageous in that a small amount of $Gd_2O_3$ and $Y_2O_3$ and appropriate amount of $WO_3$ are applied to ensure the optical glass provided in the invention enjoys lower density and excellent devitrification resistance. The optical glass provided in the invention features density ($\rho$) less than 5.0 g/cm$^3$, refractive index (nd) between 1.80 and 1.85, Abbe number (vd) between 40 and 45, transition temperature (Tg) lower than 600° C., wavelength $\lambda_{80}$ corresponding to the transmissivity of 80% below 415 nm, and upper limit of devitrification temperature below 1110° C., and is applicable to high-precision molding.

DESCRIPTION OF EMBODIMENTS

Each component of the optical glass provided by the invention is described hereunder, and the content thereof is represented by wt % unless otherwise stated.

$SiO_2$, an oxide forming glass, forms irregular continuous network with the structural units of silicon-oxygen tetrahedron and acts as the frame of optical glass. Besides, $SiO_2$ can maintain the devitrification resistance of glass. When the content of $SiO_2$ exceeds 10%, the meltability of optical glass will reduce and the softening temperature will increase. Therefore, the content of $SiO_2$ is 0.1 to 10%, preferably 3 to 7%.

$B_2O_3$, also an oxide forming glass network, is the major component to obtain stable glass especially in high-refractivity and low-dispersion lanthanide optical glass. When the content of $B_2O_3$ is less than 9%, it is difficult to obtain stable glass and the devitrification resistance is unsatisfactory; but when the content of $B_2O_3$ is higher than 20%, the refractive index of glass cannot reach the design goal and the chemical stability of glass will be reduced. Therefore, the content of $B_2O_3$ is 9 to 20%, preferably 14 to 18%.

$La_2O_3$, as a main component of high-refractivity and low-dispersion optical glass, can increase the refractive index of glass and not obviously increase the dispersion of glass. In the formulation provided in the invention, the combination of $B_2O_3$ and $La_2O_3$ may effectively improve the devitrification resistance and strengthen the chemical stability of glass. However, when the content of $La_2O_3$ is less than 20%, such effect cannot be achieved; while when the content exceeds 35%, the devitrification resistance of glass is liable to be poor. Therefore, the content of $La_2O_3$ is 20 to 35%, preferably 27 to 32%.

$ZrO_2$ can improve the viscosity, hardness, flexibility, refractive index and chemical stability of glass and lower the coefficient of thermal expansion of glass. When the content of $ZrO_2$ exceeds 8%, devitrified phenomenon will occur and the devitrification resistance of the glass will be weakened. Therefore, the content of $ZrO_2$ is 1 to 8%, preferably 2 to 6%.

ZnO, as a key component to form low-melting-point optical glass, can reduce the coefficient of thermal expansion of glass and improve the chemical stability, thermal stability and refractive index of glass. When the content of ZnO is greater than 20%, the devitrification of optical glass increases and dispersion is obviously enlarged, so it will be difficult to obtain the Abbe number (vd) above 40; while when the content of ZnO is less than 5%, the transition temperature of optical glass increases, so it will be difficult to obtain the transition temperature under 600° C. Therefore, the content of ZnO is preferably 5 to 20%, more preferably 12 to 17%.

$Ta_2O_5$ can effectively improve the refractive index, chemical stability and devitrification resistance of glass. However, if its content is too little, the effects are not obvious; while if its content is excessive, it will be hard to maintain the optical constant as shown in the present invention. Therefore, $Ta_2O_5$ is preferably 1 to 10%, more preferably 2 to 7% in terms of cost.

$Gd_2O_3$ can enhance the refractive index of glass and not obviously increase the dispersion of glass. In addition, $Gd_2O_3$ can effectively improve the devitrification resistance and strengthen the chemical stability of glass. The devitrification resistance of glass can be improved by mixing certain amount of $Gd_2O_3$ and $La_2O_3$. When the content of $Gd_2O_3$ is less than 5%, the effects are not obvious; while when the content of $Gd_2O_3$ exceeds 15%, the devitrification resistance of glass is liable to be poor. Therefore, the content of $Gd_2O_3$ is 5 to 15%, more preferably greater than 10% but less than 15%.

$Y_2O_3$ is a high-refractivity and low-dispersion component, but it may significantly enhance the transition temperature of glass and is easily to raise the upper limit of devitrification temperature of glass. As rare-earth oxide raw materials, the price ration of $Y_2O_3$, $La_2O_3$ and $Gd_2O_3$ is approximately 1:1:3.5. Through researches, the inventor found that by using certain amount of $Y_2O_3$ to replace $Gd_2O_3$, when the weight percentage ratio of $Y_2O_3$, $Gd_2O_3$ and $La_2O_3$ is 1:(1.5-2.5):(5-6) and especially when such ratio is around 1:2:6, low cost can be better achieved, the transition temperature and upper limit of devitrification temperature of glass will not be significantly increased, and the effects required by high-precision molding can be realized. Therefore, the content of $Y_2O_3$ is preferably 1 to 10%, more preferably 4 to 8%.

$TiO_2$ can effectively increase the refractive index of glass. In the present invention, adding a certain amount of $TiO_2$ can also prevent the glass from discoloration due to sun exposure, but if the content is too high, the glass will be stained and the devitrification of glass tends to be increased significantly. Therefore, the content of $TiO_2$ is 0 to 2%, preferably 0.2 to 0.5%.

$WO_3$ is mainly used to maintain the optical constant in glass and improve glass devitrification, but if the content of $WO_3$ is too high, the transmissivity of glass will reduce, staining degree will increase and devitrification property is liable to be poor. Therefore, the content of $WO_3$ is preferably 1 to 12%, more preferably 4 to 7%.

In order to better obtain the optical glass provided in the invention, the total content of $SiO_2$, $B_2O_3$, $La_2O_3$, $ZrO_2$, ZnO, $Ta_2O_5$, $Gd_2O_3$, $Y_2O_3$ and $WO_3$ is preferably greater than 97%, and $La_2O_3/La_2O_3+Gd_2O_3+Y_2O_3$ preferably less than 0.67 in the invention.

$Li_2O$ can effectively reduce the transition temperature of glass and melting temperature during glass production. If the content of $Li_2O$ is too high, the devitrification resistance is liable to be degraded and it will be difficult to achieve the target optical constants. Therefore, the content of $Li_2O$ is preferably 0 to 3%, more preferably 0.1 to 1%.

Optionally, $Sb_2O_3$ can be added as fining agent of glass in the glass melting process, usually with content at 0 to 1%. If the content of $Sb_2O_3$ is too high, the platinum vessel will be greatly damaged.

In the following paragraphs, the performance of optical glass provided in this invention will be described:

Refractive index (nd) refers to annealing value from −2° C./h to −6° C./h. The refractive index and Abbe number are measured as per the *Test Methods of Colorless Optical Glass—Refractive Index and Coefficient of Dispersion* (*GB/T* 7962.1-1987).

Transition temperature (Tg) is tested as per *Test Methods of Colorless Optical Glass—Linear Thermal Expansion Coefficient, Transition Temperature and Yield Point Temperature* (*GB/T* 7962.16-1987), namely, placing the tested sample in a certain temperature range, extending straight lines of a low-temperature region and a high-temperature region on an expansion curve of the tested sample for each 1 degree centigrade rise in temperature, intersecting the straight lines, wherein the temperature corresponding to the intersection point is the Tg.

Density is tested as per *Colorless Optical Glass Test Methods—Density* (*GB/T* 7962.20-1987).

The glass is processed into a sample which is 10 mm plus or minus 0.1 mm thick to test the wavelength $\lambda_{80}$ corresponding to the transmissivity of 80%.

The devitrification property of the glass is measured by gradient-furnace method which comprises the following steps: processing the glass into samples (180*10*10 mm), polishing lateral sides, placing the samples into a furnace with temperature gradient, taking out the samples after keeping the temperature for 4 hours, and observing the devitrification of glass under a microscope, wherein the maximum temperature corresponding to the appearance of crystals is the upper limit of devitrification temperature of glass. The lower the upper limit of devitrification temperature of glass is, the stronger the stability of glass under high temperature will be and the better production process performance will achieve.

The test shows that the optical glass provided by the invention has the following properties that the density is less than 5.0 g/cm³, refractive index (nd) ranges from 1.80 to 1.85, Abbe number (vd) ranges from 40 to 45, transition temperature (Tg) is lower than 600° C., the wavelength $\lambda_{80}$ corresponding to the transmissivity of 80% is less than 415 nm, and the upper limit of devitrification temperature below 1110° C.

EMBODIMENTS

In the following paragraphs, the embodiments of high-precision molding optical glass provided in the present invention will be described. What shall be noted is that these embodiments do not limit the scope of this invention.

The optical glasses (embodiments 1-40) shown in Tables 1 to 4 are formed by weighting based on the proportions of each embodiment in Tables 1 to 4, mixing the ordinary raw materials for optical glass (such as oxide, hydroxide, carbonate, nitrate and fluoride), placing the mixed raw materials in a platinum crucible, melting under the temperature of 1100 to 1300° C., obtaining homogeneous molten glass without bubbles and undissolved substances after melting, clarification, stirring and homogenization, shaping the molten glass in a mould and perform annealing.

Tables 1 to 4 indicate the composition, refractive index (nd), Abbe number (vd), density (ρ) and glass transition temperature (Tg) of embodiments 1~40 of the invention. The composition of each component is represented by wt % in such tables.

TABLE 1

| Composition | Embodiments | | | | | | | | | |
|---|---|---|---|---|---|---|---|---|---|---|
| | 1 | 2 | 3 | 4 | 5 | 6 | 7 | 8 | 9 | 10 |
| $SiO_2$ | 0.12 | 9.88 | 7.36 | 3.03 | 6.87 | 6.2 | 8.32 | 5.94 | 6.34 | 4.35 |
| $B_2O_3$ | 19.97 | 9.03 | 16.97 | 17.86 | 15.2 | 15.4 | 12.41 | 15.05 | 16.54 | 17.32 |
| $La_2O_3$ | 29.46 | 34.86 | 23.03 | 29.8 | 31.87 | 28.5 | 29.8 | 31.25 | 28.98 | 28.22 |
| $ZrO_2$ | 7.88 | 1.11 | 6.21 | 2.12 | 5.86 | 4.7 | 5.7 | 4.39 | 3.28 | 4.85 |
| ZnO | 5.12 | 19.78 | 18.56 | 16.91 | 11.23 | 15.1 | 16.2 | 15.47 | 12.22 | 16.1 |
| $Ta_2O_5$ | 9.78 | 1.13 | 8.69 | 2.76 | 6.76 | 4.5 | 4.39 | 5.64 | 4.91 | 6.25 |
| $TiO_2$ | | 1.86 | 0.45 | 0.48 | 0.21 | | 0.35 | 0.21 | 0.36 | |
| $Gd_2O_3$ | 14.85 | 5.05 | 13.45 | 14.84 | 10.05 | 12.5 | 11.33 | 10.26 | 12.54 | 11.09 |
| $Y_2O_3$ | 8.86 | 5.45 | 3.04 | 7.89 | 4.12 | 6.0 | 4.6 | 6.37 | 7.52 | 5.34 |
| $WO_3$ | 1.12 | 11.85 | 1.04 | 4.06 | 6.92 | 6.6 | 6.5 | 4.58 | 6.31 | 5.97 |
| $Li_2O$ | 2.84 | | 1.2 | 0.25 | 0.91 | 0.5 | 0.4 | 0.84 | 0.6 | 0.51 |
| $Sb_2O_3$ | 0.02 | 0.03 | 0.01 | 0.04 | 0.01 | | 0.02 | 0.03 | 0.01 | 0.05 |
| nd | 1.835 | 1.849 | 1.802 | 1.831 | 1.828 | 1.822 | 1.821 | 1.828 | 1.820 | 1.824 |
| vd | 44.8 | 40.1 | 45.0 | 43.3 | 43.0 | 42.5 | 42.3 | 43.1 | 42.2 | 42.3 |
| Tg(° C.) | 597 | 585 | 550 | 598 | 588 | 596 | 597 | 572 | 598 | 591 |
| λ80 | 386 | 412 | 395 | 392 | 396 | 397 | 395 | 390 | 398 | 396 |
| Devitrification temperature (° C.) | 1100 | 1085 | 1105 | 1070 | 1100 | 1090 | 1085 | 1100 | 1085 | 1085 |
| ρ (g/cm³) | 4.99 | 4.93 | 4.80 | 4.95 | 4.89 | 4.90 | 4.89 | 4.92 | 4.90 | 4.90 |

TABLE 2

| Composition | Embodiments | | | | | | | | | |
|---|---|---|---|---|---|---|---|---|---|---|
| | 11 | 12 | 13 | 14 | 15 | 16 | 17 | 18 | 19 | 20 |
| $SiO_2$ | 2.12 | 8.38 | 6.64 | 6.81 | 5.87 | 6.16 | 4.91 | 6.34 | 5.2 | 6.05 |
| $B_2O_3$ | 17.37 | 10.83 | 14.77 | 17.1 | 17.06 | 16.34 | 17.03 | 16.93 | 16.7 | 16.38 |
| $La_2O_3$ | 30.52 | 28.69 | 29 | 26.88 | 27.62 | 29.14 | 28.17 | 26.63 | 26.45 | 26.28 |
| $ZrO_2$ | 6.8 | 7.1 | 5.39 | 3.33 | 4.09 | 4.08 | 3.7 | 2.69 | 5.08 | 5.39 |
| ZnO | 15.12 | 17.55 | 14.67 | 15.2 | 15.47 | 16.22 | 14.82 | 15.62 | 14.35 | 15.71 |
| $Ta_2O_5$ | 3.78 | 5.38 | 6.27 | 5.38 | 4.39 | 2.91 | 6.22 | 5.33 | 6.08 | 4.35 |
| $TiO_2$ | | | 0.46 | 0.27 | 0.37 | 0.29 | 0.35 | 0.41 | 0.44 | 0.28 |
| $Gd_2O_3$ | 13.5 | 29.5 | 11.28 | 12.35 | 14.16 | 13.71 | 12.37 | 13.28 | 13.82 | 12.08 |
| $Y_2O_3$ | 8.34 | 3.68 | 3.45 | 6.57 | 6.44 | 4.33 | 6.51 | 5.38 | 6.92 | 6.34 |
| $WO_3$ | 1.62 | 8.35 | 7.31 | 5.67 | 3.91 | 6.48 | 5.38 | 6.74 | 4.39 | 6.47 |
| $Li_2O$ | 0.81 | 0.54 | 0.76 | 0.44 | 0.62 | 0.34 | 0.54 | 0.65 | 0.57 | 0.67 |
| $Sb_2O_3$ | 0.02 | 0.01 | 0.02 | 0.03 | 0.02 | 0.04 | 0.02 | 0.01 | 0.03 | 0.02 |
| nd | 1.841 | 1.841 | 1.842 | 1.801 | 1.813 | 1.809 | 1.825 | 1.808 | 1.819 | 1.813 |
| vd | 44.1 | 40.5 | 40.5 | 41.6 | 43.5 | 42.1 | 42.3 | 41.9 | 43.0 | 42.8 |
| Tg(° C.) | 575 | 582 | 580 | 592 | 595 | 594 | 590 | 581 | 593 | 580 |
| λ80 | 390 | 395 | 406 | 392 | 391 | 398 | 394 | 396 | 392 | 395 |

TABLE 2-continued

| Composition | Embodiments | | | | | | | | | |
|---|---|---|---|---|---|---|---|---|---|---|
| | 11 | 12 | 13 | 14 | 15 | 16 | 17 | 18 | 19 | 20 |
| Devitrification temperature (° C.) | 1100 | 1100 | 1100 | 1085 | 1095 | 1085 | 1090 | 1090 | 1090 | 1100 |
| ρ (g/cm$^3$) | 4.96 | 4.94 | 4.95 | 4.90 | 4.87 | 4.85 | 4.89 | 4.85 | 4.88 | 4.86 |

TABLE 3

| Composition | Embodiments | | | | | | | | | |
|---|---|---|---|---|---|---|---|---|---|---|
| | 21 | 22 | 23 | 24 | 25 | 26 | 27 | 28 | 29 | 30 |
| SiO$_2$ | 5.1 | 4.85 | 5.1 | 5.02 | 5.12 | 5.13 | 5.22 | 4.88 | 5.11 | 5.2 |
| B$_2$O$_3$ | 17.2 | 16.11 | 15.83 | 16.04 | 15.99 | 16.2 | 15.87 | 16.17 | 16.15 | 16.49 |
| La$_2$O$_3$ | 29.07 | 29.92 | 30.51 | 29.48 | 30.18 | 29.4 | 29.82 | 29.74 | 29.63 | 29.49 |
| ZrO$_2$ | 4.01 | 3.96 | 4.26 | 4.03 | 4.25 | 4.08 | 4.32 | 4.08 | 4.31 | 3.88 |
| ZnO | 15.34 | 15.21 | 14.88 | 15.11 | 14.92 | 15.03 | 14.95 | 15.02 | 14.98 | 15.2 |
| Ta$_2$O$_5$ | 5.22 | 5.46 | 4.86 | 5.04 | 4.87 | 5.14 | 4.95 | 5.12 | 4.88 | 5.1 |
| TiO$_2$ | 0.25 | 0.31 | 0.27 | 0.32 | 0.38 | 0.36 | 0.28 | 0.33 | 0.29 | 0.34 |
| Gd$_2$O$_3$ | 12.3 | 12.24 | 12.25 | 12.61 | 11.96 | 12.55 | 12.52 | 12.53 | 12.51 | 12.39 |
| Y$_2$O$_3$ | 5.86 | 6.04 | 5.93 | 6.22 | 6.31 | 6.2 | 6.04 | 6.14 | 6.05 | 5.84 |
| WO$_3$ | 5.12 | 5.32 | 5.6 | 5.61 | 5.48 | 5.42 | 5.48 | 5.51 | 5.62 | 5.56 |
| Li$_2$O | 0.53 | 0.6 | 0.51 | 0.52 | 0.54 | 0.49 | 0.55 | 0.48 | 0.47 | 0.51 |
| Sb$_2$O$_3$ | 0.02 | 0.01 | 0.02 | 0.02 | 0.03 | 0.01 | 0.01 | 0.03 | 0.02 | 0.02 |
| nd | 1.816 | 1.830 | 1.829 | 1.828 | 1.827 | 1.824 | 1.830 | 1.829 | 1.827 | 1.821 |
| vd | 42.5 | 42.6 | 42.7 | 42.6 | 42.8 | 42.6 | 42.7 | 42.7 | 42.7 | 42.4 |
| Tg(° C.) | 593 | 591 | 595 | 595 | 594 | 596 | 594 | 596 | 597 | 594 |
| λ80 | 389 | 395 | 396 | 395 | 396 | 394 | 395 | 396 | 395 | 393 |
| Devitrification temperature (° C.) | 1090 | 1095 | 1090 | 1090 | 1090 | 1090 | 1090 | 1090 | 1090 | 1090 |
| ρ (g/cm$^3$) | 4.86 | 4.92 | 4.92 | 4.91 | 4.91 | 4.91 | 4.92 | 4.92 | 4.91 | 4.90 |

TABLE 4

| Composition | Embodiments | | | | | | | | | |
|---|---|---|---|---|---|---|---|---|---|---|
| | 31 | 32 | 33 | 34 | 35 | 36 | 37 | 38 | 39 | 40 |
| SiO$_2$ | 5.0 | 4.84 | 5.0 | 5.0 | 5.3 | 5.2 | 5.45 | 4.9 | 5.10 | 5.0 |
| B$_2$O$_3$ | 17.2 | 16.10 | 15.95 | 16.05 | 15.8 | 16.0 | 15.9 | 16.2 | 16.15 | 16.7 |
| La$_2$O$_3$ | 31.8 | 30.0 | 32.55 | 32.2 | 32.4 | 31.0 | 30.0 | 30.0 | 28.95 | 34.8 |
| ZrO$_2$ | 4.00 | 3.95 | 4.26 | 4.05 | 4.25 | 3.9 | 5.30 | 4.00 | 4.30 | 3.04 |
| ZnO | 15.35 | 15.20 | 14.9 | 15.10 | 14.80 | 15.05 | 14.95 | 13.85 | 15.0 | 14.2 |
| Ta$_2$O$_5$ | 5.00 | 5.65 | 4.85 | 5.1 | 4.85 | 5.0 | 6.5 | 5.0 | 4.9 | 4.0 |
| TiO$_2$ | 0.25 | 0.30 | 0.27 | 0.32 | 0.38 | 0.35 | 0.28 | 0.24 | 0.29 | 0.35 |
| Gd$_2$O$_3$ | 10.6 | 12.0 | 10.25 | 9.65 | 10.8 | 11.85 | 10.0 | 15.0 | 13.75 | 11.6 |
| Y$_2$O$_3$ | 5.3 | 6.0 | 5.85 | 6.4 | 5.4 | 5.9 | 5 | 6.0 | 5.5 | 5.8 |
| WO$_3$ | 5.00 | 5.35 | 5.6 | 5.60 | 5.45 | 5.25 | 6.06 | 4.4 | 5.54 | 4.0 |
| Li$_2$O | 0.50 | 0.6 | 0.50 | 0.51 | 0.55 | 0.49 | 0.55 | 0.4 | 0.50 | 0.50 |
| Sb$_2$O$_3$ | | 0.01 | 0.02 | 0.02 | 0.02 | 0.01 | 0.01 | 0.01 | 0.02 | 0.01 |
| nd | 1.819 | 1.831 | 1.830 | 1.828 | 1.827 | 1.823 | 1.824 | 1.830 | 1.826 | 1.830 |
| vd | 42.6 | 42.6 | 42.4 | 42.3 | 42.8 | 42.6 | 42.7 | 42.9 | 42.7 | 43.1 |
| Tg(° C.) | 595 | 590 | 595 | 595 | 594 | 596 | 593 | 599 | 596 | 598 |
| λ80 | 389 | 395 | 396 | 395 | 396 | 393 | 395 | 385 | 395 | 390 |
| Devitrification temperature (° C.) | 1080 | 1090 | 1090 | 1090 | 1085 | 1085 | 1080 | 1085 | 1085 | 1095 |
| ρ (g/cm$^3$) | 4.87 | 4.92 | 4.92 | 4.91 | 4.91 | 4.90 | 4.90 | 4.93 | 4.90 | 4.93 |

As illustrated in the above embodiments, the optical glass provided by the invention is characterized by density (ρ) less than 5.0 g/cm$^3$, refractive index (nd) ranging from 1.80 to 1.85, Abbe number (vd) ranging from 40 to 45, transition temperature (Tg) lower than 600° C., wavelength λ$_{80}$ corresponding to the transmissivity of 80% below 415 nm and upper limit of devitrification temperature below 1110° C., and is applicable to high-precision molding.

The invention claimed is:

1. An optical glass, comprising SiO$_2$, B$_2$O$_3$, La$_2$O$_3$, ZrO$_2$, ZnO, Ta$_2$O$_5$, Gd$_2$O$_3$, Y$_2$O$_3$ and WO$_3$, with density less than 5.0 g/cm$^3$, refractive index between 1.80 and 1.85, Abbe number between 40 and 45, transition temperature lower than 600° C., wavelength $\lambda_{80}$ corresponding to the transmissivity of 80% below 415 nm, and upper limit of devitrification temperature below 1110° C., wherein $La_2O_3/La_2O_3+Gd_2O_3+Y_2O_3$ is less than 0.67, and $Gd_2O_3$ content is 5-15 wt %.

2. The optical glass according to claim 1, comprising 0.1-10 wt % of $SiO_2$, 9-20 wt % of $B_2O_3$, 20-35 wt % of $La_2O_3$, 1-8 wt % of $ZrO_2$, 5-20 wt % of ZnO, 1-10 wt % of $Ta_2O_5$, 5-15 wt % of $Gd_2O_3$, 0-2 wt % of $TiO_2$, 1-10 wt % of $Y_2O_3$, 1-12 wt % of $WO_3$, 0-3 wt % of $Li_2O$ and 0-1 wt % of $Sb_2O_3$.

3. The optical glass according to claim 1, wherein $SiO_2$ accounts for 3 to 7%.

4. The optical glass according to claim 1, wherein $B_2O_3$ accounts for 14 to 18% and $La_2O_3$ accounts for 27 to 32%.

5. The optical glass according to claim 1, wherein $ZrO_2$ accounts for 2 to 6%.

6. The optical glass according to claim 1, wherein ZnO accounts for 12 to 17%.

7. The optical glass according to claim 1, wherein $Ta_2O_5$ accounts for 2 to 7%.

8. The optical glass according to claim 1, wherein $La_2O_3$ accounts for 27 to 32% and $Gd_2O_3$ is greater than 10% but less than 15%.

9. The optical glass according to claim 1, wherein $WO_3$ accounts for 4 to 7%.

10. The optical glass according to claim 1, wherein $Y_2O_3$ accounts for 4 to 8%.

11. The optical glass according to claim 1, wherein the total content of $SiO_2$, $B_2O_3$, $La_2O_3$, $ZrO_2$, ZnO, $Ta_2O_5$, $Gd_2O_3$, $Y_2O_3$ and $WO_3$ is greater than 97%.

12. The optical glass according to claim 1, wherein the weight percentage ratio of $Y_2O_3$, $Gd_2O_3$ and $La_2O_3$ is 1:(1.5-2.5):(5-6).

13. The optical glass according to claim 2, wherein $TiO_2$ accounts for 0.2 to 0.5%.

14. The optical glass according to claim 2, wherein $Li_2O$ accounts for 0.1 to 1%.

15. An optical glass, comprising 0.1-10 wt % of $SiO_2$, 9-20 wt % of $B_2O_3$, 20-35 wt % of $La_2O_3$, 1-8 wt % of $ZrO_2$, 5-20 wt % of ZnO, 1-10 wt % of $Ta_2O_5$, 5-15 wt % of $Gd_2O_3$, 0-2 wt % of $TiO_2$, 1-10 wt % of $Y_2O_3$, 1-12 wt % of $WO_3$, 0-3 wt % of $Li_2O$ and 0-1 wt % of $Sb_2O_3$, wherein $La_2O_3/La_2O_3+Gd_2O_3+Y_2O_3$ is less than 0.67.

16. The optical glass according to claim 15, wherein $SiO_2$ accounts for 3 to 7%.

17. The optical glass according to claim 15, wherein $B_2O_3$ accounts for 14 to 18% and $La_2O_3$ accounts for 27 to 32%.

18. The optical glass according to claim 15, wherein $ZrO_2$ accounts for 2 to 6%.

19. The optical glass according to claim 15, wherein ZnO accounts for 12 to 17%.

20. The optical glass according to claim 15, wherein $Ta_2O_5$ accounts for 2 to 7%.

21. The optical glass according to claim 15, wherein $La_2O_3$ accounts for 27 to 32% and $Gd_2O_3$ is greater than 10% but less than 15%.

22. The optical glass according to claim 15, wherein $TiO_2$ accounts for 0.2 to 0.5%.

23. The optical glass according to claim 15, wherein $Y_2O_3$ accounts for 4 to 8%.

24. The optical glass according to claim 15, wherein $WO_3$ accounts for 4 to 7%.

25. The optical glass according to claim 15, wherein $Li_2O$ accounts for 0.1 to 1%.

26. The optical glass according to claim 15, wherein the total content of $SiO_2$, $B_2O_3$, $La_2O_3$, $ZrO_2$, ZnO, $Ta_2O_5$, $Gd_2O_3$, $Y_2O_3$ and $WO_3$ is greater than 97%.

27. The optical glass according to claim 15, wherein the weight percentage ratio of $Y_2O_3$, $Gd_2O_3$ and $La_2O_3$ is 1:(1.5-2.5):(5-6).

28. A glass preform made of the optical glass according to claims 1.

29. An optical element made of the optical glass according to claim 1.

30. An optical apparatus made of the optical glass according to claim 1.

* * * * *